UNITED STATES PATENT OFFICE.

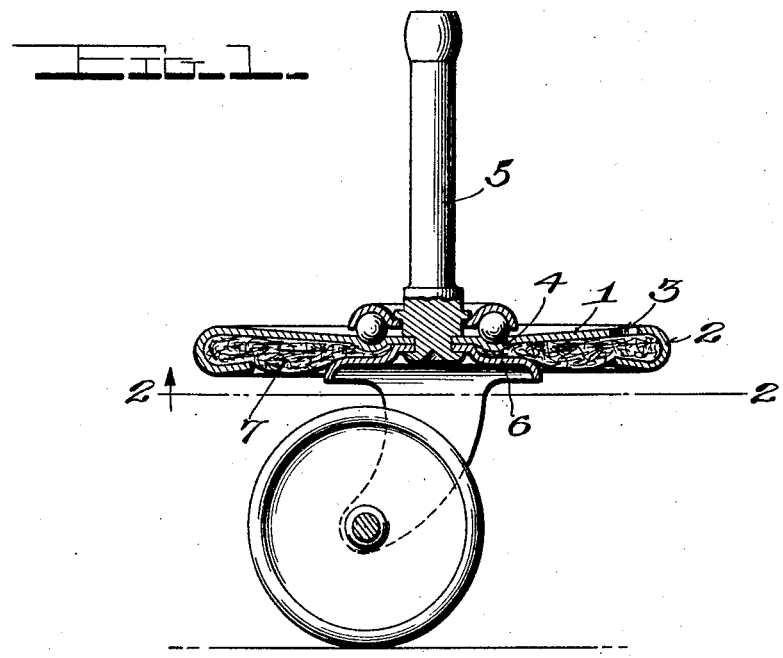
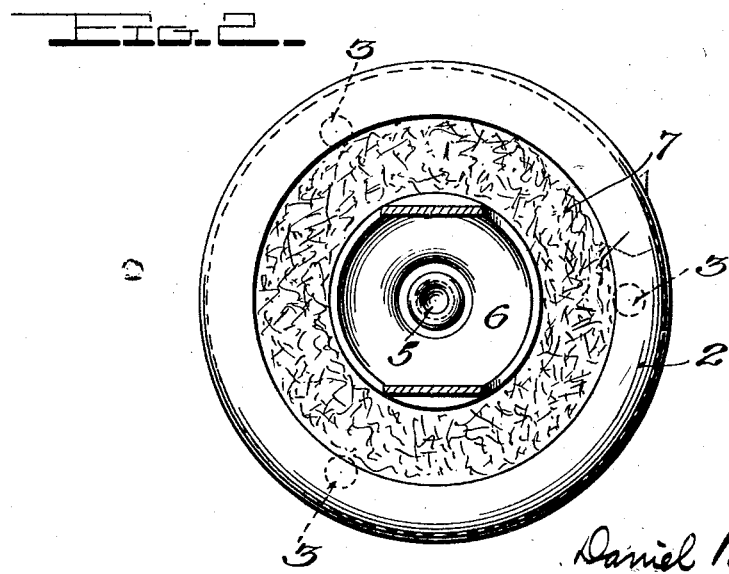

DANIEL B. DISS, OF NEWARK, NEW JERSEY, ASSIGNOR TO THE BASSICK COMPANY, OF BRIDGEPORT, CONNECTICUT, A CORPORATION OF CONNECTICUT.

INSECT-PROOF CASTER.

1,325,316.     Specification of Letters Patent.     Patented Dec. 16, 1919.

Application filed March 31, 1919. Serial No. 286,459.

*To all whom it may concern:*

Be it known that I, DANIEL B. DISS, a citizen of the United States, residing at the city of Newark, in the county of Essex and State of New Jersey, have invented certain new and useful Improvements in Insect-Proof Casters; and I do declare the following to be a full, clear, and exact description of the invention, such as will enable others skilled in the art to which it appertains to make and use the same.

This invention relates to certain new and useful improvements in insect proof casters, and has for its object to provide an improved and practical device which avoids the use of a liquid body and which operates efficiently in preventing insects passing thereover.

Liquid containing cups have heretofore been applied to casters to guard furniture against insects, but same are objectionable for the reason that upon removal of the caster, either by design or otherwise, the liquid is likely to spill and stain the floor or carpet, which contingency also exists when the furniture is moved about the room. In addition, the liquid, usually oil, collects and accordingly becomes contaminated with dirt and foreign matter or substances, necessitating cleaning and refilling with a fresh supply of the liquid. Further, the surface of the liquid affords means enabling the insects to sometimes reach the furniture whereby the guard fails to function as such.

The present invention, in brief, aims to overcome all of the above disadvantages and to provide a simple economical and practical device which fully protects the wick, the latter holding the liquid by absorption.

In the drawings:

Figure 1, is a vertical sectional view of the invention; and

Fig. 2, is a section taken on line 2—2 of Fig. 1.

In proceeding in accordance with the present invention, a guard is provided which consists of a member having a substantially flat top 1, and a curled peripheral or edge portion 2, the top being provided with an opening 3. The top may also be formed with a ball-receiving channel 4, though the invention may or may not be used with ball-bearings. The shank 5, passes through the top 1, and engages a horn 6, common to casters, passing through the horn and being headed into engagement therewith as depicted in Fig. 1. A pad 7, of approximately ring-shape is engaged at its periphery with the curled flange 2 and seats on top of the horn 6, in surrounding relation to the headed lower end of the caster pintle, and is clamped firmly both against the under face of the top 1, and between the top of the horn and the depressed bottom of the channel 4, in case such channel is employed in the instance of ball-bearing casters. This pad is made of absorbent material, such as felt, or the like and is effectively clamped by the flange 2 and the horn, so as to be firmly and immovably held in place, and in surrounding relation to the caster shank, so that upon saturating the pad with insect-repellent liquid or the like, by placing the same through the inlet opening 3 insects will be prevented from reaching the top. One or more of these openings 3, may be employed as shown in Fig. 2.

The top 1, serves to prevent dirt and dust from falling onto the absorbent pad 7, so that the latter is fully protected, the curled flange 2, acting to protect the periphery of the pad as is apparent. The pad cannot become disengaged due to its aforementioned securement, and by bending the free edge of the flange 2, inwardly toward the top 1, the clamping degree of the pad may be regulated as desired.

The invention is not as above stated limited to ball-bearing casters, and obviously may be employed with other types of casters than that illustrated in the drawings.

What is claimed is:

In an insect proof caster, a sheet metal member having a substantially flat top, a substantially flat pad disposed throughout parallel to the top, a horn on which the pad seats, and a shank passed through the top and horn for securing same together, said member having a peripheral inturned flange which engages flat beneath the pad and lies parallel to the top so as to engage the under face of the pad to hold the peripheral portion thereof against the under face of the top, said flange being relatively narrow so as to effect maximum exposure of the under face of the pad.

In testimony whereof I affix my signature.

DANIEL B. DISS.

Witnesses:
ROBERT F. RHODES,
JOHN A. HARRIS.